United States Patent
Rymarchyk, Jr. et al.

(10) Patent No.: US 7,402,274 B2
(45) Date of Patent: Jul. 22, 2008

(54) METAL MAKING LANCE SLAG DETECTION SYSTEM

(75) Inventors: Nicholas M. Rymarchyk, Jr., Baden, PA (US); George Cingle, III, Gibsonia, PA (US); Michael T. Mattich, Butler, PA (US)

(73) Assignee: Berry Metal Company, Harmony, PA (US)

(*) Notice: Subject to any disclaimer, the term of this patent is extended or adjusted under 35 U.S.C. 154(b) by 420 days.

(21) Appl. No.: 11/295,863

(22) Filed: Dec. 7, 2005

(65) Prior Publication Data

US 2007/0126162 A1    Jun. 7, 2007

(51) Int. Cl.
*C21C 5/46*    (2006.01)

(52) U.S. Cl. .............................. 266/78; 266/99; 266/225

(58) Field of Classification Search .................... 266/78, 266/99, 100, 225, 47
See application file for complete search history.

(56) References Cited

U.S. PATENT DOCUMENTS

| | | | | |
|---|---|---|---|---|
| 4,052,005 A | * | 10/1977 | Rymarchyk, Jr. | ............ 266/225 |
| 4,106,756 A | | 8/1978 | Rymarchyk et al. | |
| 4,317,561 A | * | 3/1982 | Schulz | ........................ 266/265 |
| 4,533,124 A | | 8/1985 | Mercatoris | |
| 5,865,876 A | * | 2/1999 | Watkins et al. | ................. 266/47 |
| 6,217,824 B1 | | 4/2001 | Leczo et al. | |
| 6,599,464 B1 | | 7/2003 | Feldhaus | |
| 6,849,228 B2 | | 2/2005 | Thomas | |

FOREIGN PATENT DOCUMENTS

| | | |
|---|---|---|
| DE | 3543836 | 6/1987 |
| WO | WO92/14970 | 9/1992 |

* cited by examiner

*Primary Examiner*—Scott Kastler
(74) *Attorney, Agent, or Firm*—John F. Letchford; Archer & Greiner, P.C.

(57) ABSTRACT

A fully automated system and method for rapidly and reliably detecting the ingestion of slag within the tip of a metal making lance. The system utilizes a temperature sensor disposed adjacent to the inner surface of the inner wall of a metal making lance tip. The sensor is in communication with a control station. The control station is preferably in operative communication with a valve for shutting off gas flow to the lance and, optionally, at least one alarm, a coolant fluid shut-off valve, and any other lance operation mechanisms as may be desired or necessary when slag is detected by the sensor. The inner wall of the lance tip is also preferably formed with a slag collecting reservoir for collecting ingested slag and directing it toward the temperature sensor for quick and reliable slag detection.

11 Claims, 5 Drawing Sheets

METAL MAKING LANCE SLAG DETECTION SYSTEM

FIELD OF THE INVENTION

The present invention relates in general to metal making equipment and in particular to metal making lances.

BACKGROUND OF THE INVENTION

In many metal making processes, such as for example, steelmaking processes, water-cooled lances are inserted into a furnace vessel. In the steelmaking environment, a lance may be inserted into a basic oxygen furnace (BOF), electric arc furnace (EAF), etc., to promote melting, decarburization, refining and other processes useful in converting iron-containing scrap material within the vessel into steel. A typical lance may inject gaseous materials such as oxygen, hydrocarbon gas and/or inert gas at high velocity at various times to achieve desired treatment of the scrap metal and/or maintenance of the interior of the vessel. Some lances may also inject particulate carbon and/or lime (or similar substances) to achieve desired properties in the metal ultimately produced.

Water-cooled lances generally comprise an adapter portion, an elongated barrel portion connected at a first end thereof to the adapter portion and lance tip portion connected to a second end of the barrel portion.

The adapter portion comprises at least one inlet for receiving the gaseous and/or particulate matter to be injected into the furnace vessel, which matter will hereinafter be generally referred to as "active material." The adapter portion also includes a water inlet and a water outlet for circulating pressurized cooling water throughout the lance.

The barrel portion comprises at least three substantially concentrically arranged metal, typically steel, pipes for communicating the cooling water and/or active material(s) between the adapter portion and the lance tip portion. The outermost and first innermost pipes normally define an annular water return passageway for conveying coolant water from the lance tip portion to the adapter portion. The first and second innermost pipes normally define an annular water delivery passageway for conveying coolant water to the lance tip portion from the adapter portion. And, the interior of the second innermost pipe (and any additional pipes arranged concentrically interiorly thereof) defines at least one passageway for conveying active material from the adapter portion to the lance tip for injection into the furnace vessel.

The lance tip portion usually comprises an assembly having one or more parts which may be secured by welding, soldering or the like to the concentric pipes of the barrel portion. The lance tip assembly comprises at least one nozzle in communication with the at least one active material passageway of the barrel portion for injecting or discharging the active material into the furnace vessel. The tip assembly further comprises passage means for connecting the water delivery and return passageways of the barrel portion to one another. So constructed, water or other coolant fluid may be continuously circulated through the lance to cool the lance, especially the lance tip assembly which is exposed to the greatest temperatures during lance operation. Indeed, if coolant water is not effectively conveyed through the lance tip portion then the assembly may become non-uniformly heated. This, in turn, may lead to so-called "hot-spots" or "burn-through" sites which often result in premature failure of the lance tip. Examples of lances including systems and methods for detecting potential lance tip burn-through prior to the occurrence of burn-through or automatically responding in the event of failure are found in U.S. Pat. Nos. 6,599,464 and 4,533,124 and German Offenlegungsschrift DE 3543836. Among these, U.S. Pat. No. 6,599,464 describes an assembly where a temperature sensor is received within a post disposed in a sealed chamber behind the working face and in front of the inner face of the lance tip.

Another type of lance failure may occur when slag is "ingested" by the lance. Slag may be ingested through lances nozzles in either of two ways: "blow-back" and flow interruption. Blow-back is the reaction of the burner flame bouncing from the scrap onto the burner housing and possibly into inactive burner ports when a metal making lance is functioning in a burner mode (if a particular lance is equipped to function as a burner). Blow-back can carry furnace slag into the inactive ports or nozzles of the lance tip. Slag ingestion may also occur as a result of a gas flow interruption when the ferrostatic pressure differential of the slag/steel emulsion surrounding the lance/burner forces the slag into the lance nozzles.

In either case, ingested slag can lead to catastrophic lance failure if it is not quickly detected. When high velocity oxygen gas flow through the lance is restarted, potentially explosive conditions can arise at the inner wall of the lance tip. Sources of heat, oxygen and fuel must be simultaneously present for dangerous spontaneous combustion to occur within a lance assembly. This confluence of circumstances happens when slag has been ingested by a lance and a flow of oxygen comes into contact with the slag such as when the lance is refining the metal within a furnace vessel. The ingested slag (which may typically range in temperature from about 2300° F. and 3000° F. depending on the elapsed heat time) provides the heat. The oxygen provides an oxygenating atmosphere and the copper or carbon in the copper or steel inner wall of the lance tip provides a source of combustible fuel. When the copper or carbon begins to combust in the highly oxygenated environment, the lance tip inner wall is consumed. If the process is not quickly detected and the oxygen gas flow stopped, a burn-through occurs, thereby resulting in an violent coolant water breach that may cause severe damage not only to the lance but the surrounding furnace vessel and equipment as well.

An advantage exists, therefore, for a system and method for rapidly and reliably detecting the ingestion of slag within a metal making lance tip.

A further advantage exists for a system and method for immediately and automatically ceasing oxygen-containing gas flow through a metal making lance upon detection of the ingestion of slag within the lance tip.

SUMMARY OF THE INVENTION

The present invention provides a system and method for rapidly and reliably detecting the ingestion of slag within the tip of a metal making lance. The system is fully automated and utilizes a temperature sensor disposed adjacent to the inner surface of the inner wall of a metal making lance tip. The sensor is in thermal or electronic communication with a control station. The control station is preferably in operative communication with a valve for shutting off gas flow to the lance and, optionally, at least one alarm, a coolant fluid shut-off valve, and any other lance operation mechanisms as may be desired or necessary. The inner wall of the lance tip is also preferably formed with a slag collecting reservoir for collecting ingested slag and directing it toward the temperature sensor. In this way, the ingested slag is placed closely to, preferably in contact with, the sensor so that existence of the slag is quickly and reliably detected. In response to slag detection, the oxygen-containing gas flow control immediately terminates the gas flow, and optional coolant water and alarm controls are likewise activated.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
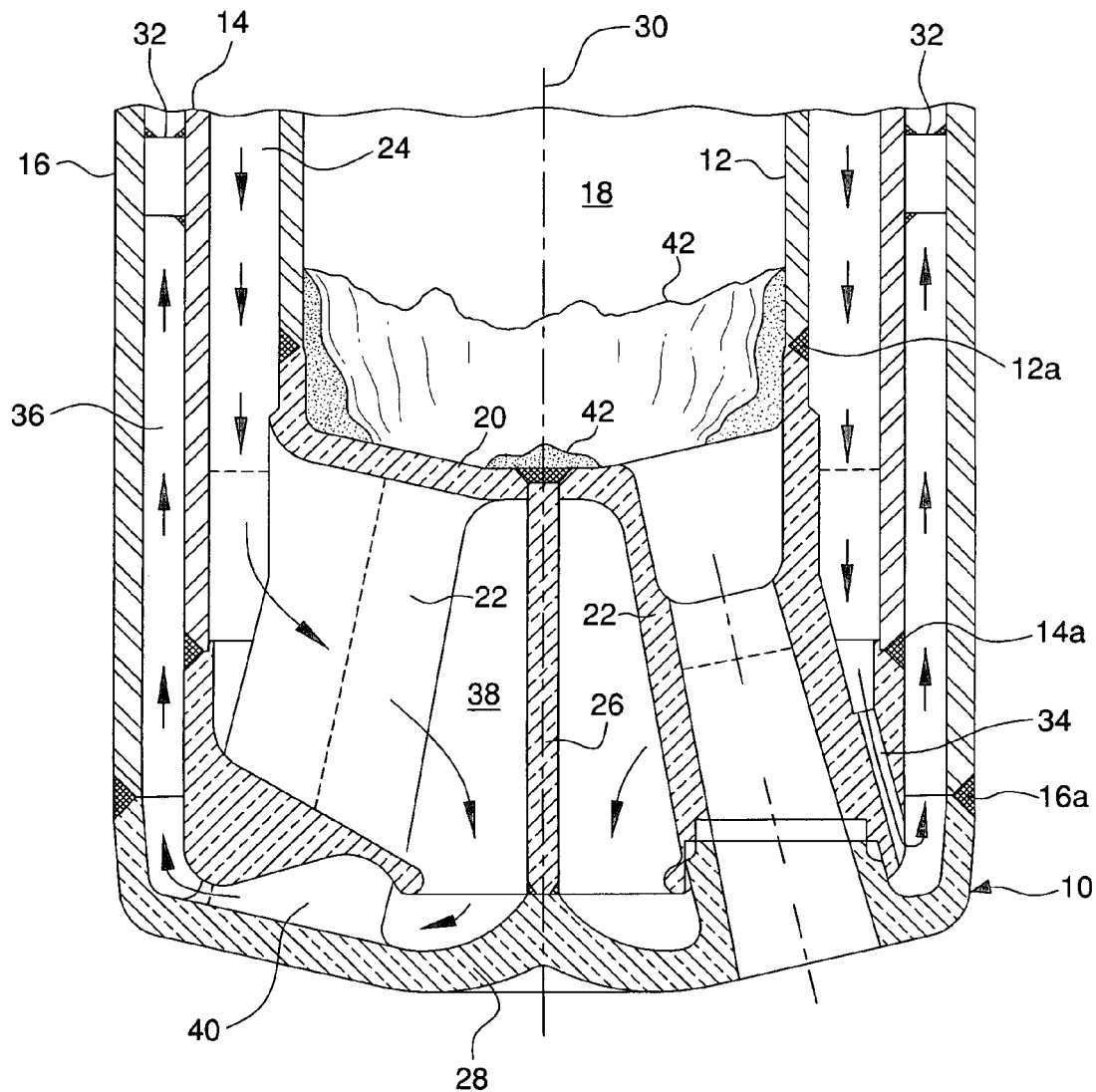
FIG. 1 is an elevational cross-section view of a conventional lance tip assembly with slag ingested therein.

FIG. 1 represents a metal making lance tip assembly constructed in accordance with the prior art, identified generally by reference numeral 10. As is known, the upper ends of the concentric walls of tip assembly 10 are fixedly attached using suitable bonding material by welding, soldering, brazing, adhesion, or the like, as indicated by 12a, 14a and 16a, respectively, to the lower ends of concentric steel pipes 12, 14 and 16 of the barrel portion of an elongated lance.

The central pipe 12 defines a central passageway 18 for delivering pressurized active material to the inner wall 20 of tip assembly 10. Upon reaching inner wall 20 the active material passes through discharge ports or nozzles 22 into the metal making vessel. An annular space formed by pipe 12 and pipe 14 defines a coolant fluid inlet passageway 24 which is connected to an unillustrated supply of cooling water and delivers water to the lance tip assembly. Tip assembly 10 may include a support post 26 fabricated from copper or steel that may be affixed by welding or the like to the inner surface of working face 28 and the inner wall 20 along a central longitudinal axis 30 of the tip assembly. The support post 26 adds structural support to the center of the working face 28 during lance operation. A plurality of spacers 32 may be welded firmly to the inner sleeve 14 and outer sleeve 16 to prevent relative motion of the sleeves during operation. Tip assembly 10 may also include bypass passageways 34 typically corresponding in number and disposition to nozzles 22 to enable cooling of the radially outermost areas thereof. During lance operation, coolant water continuously flows through coolant fluid delivery passageway 24 into passage means provided in the lance tip assembly and then into an annular coolant fluid return passageway 36. More particularly, coolant water flows downwardly through passageway 24 and bypass passageway(s) 34 (if present), around the exterior surfaces of nozzles 20, into a first coolant fluid flow space 38, and then into a second coolant fluid flow space 40 established behind the inner surface of working face 28. While in space 40, the coolant water flows around the exterior surfaces of the lower portions of the nozzles 22 in a manner generally indicated by the water flow arrows shown in FIG. 1. Upon exiting space 40, the coolant water combines with the coolant water exiting bypass passageway(s) 34, if present, and enters the coolant fluid return passageway 36 formed between pipes 14 and 16 whereupon the water is returned from the lance tip to the coolant water supply and is again recirculated through the lance.

As described hereinabove, slag may be ingested by the lance by the "blow-back" phenomenon. It may also occur by gas flow interruption whereby, when gas flow is interrupted, the ferrostatic pressure differential between the interior and exterior of the lance forces slag upwardly into nozzles 22 such that it accumulates on and around the inner face 20a of inner wall 20, as indicated by reference numeral 42. When such slag is present, combustion may occur upon restart of a high velocity oxygen-containing gas flow through the lance which, as discussed, could lead to catastrophic lance failure.

Figure 2:
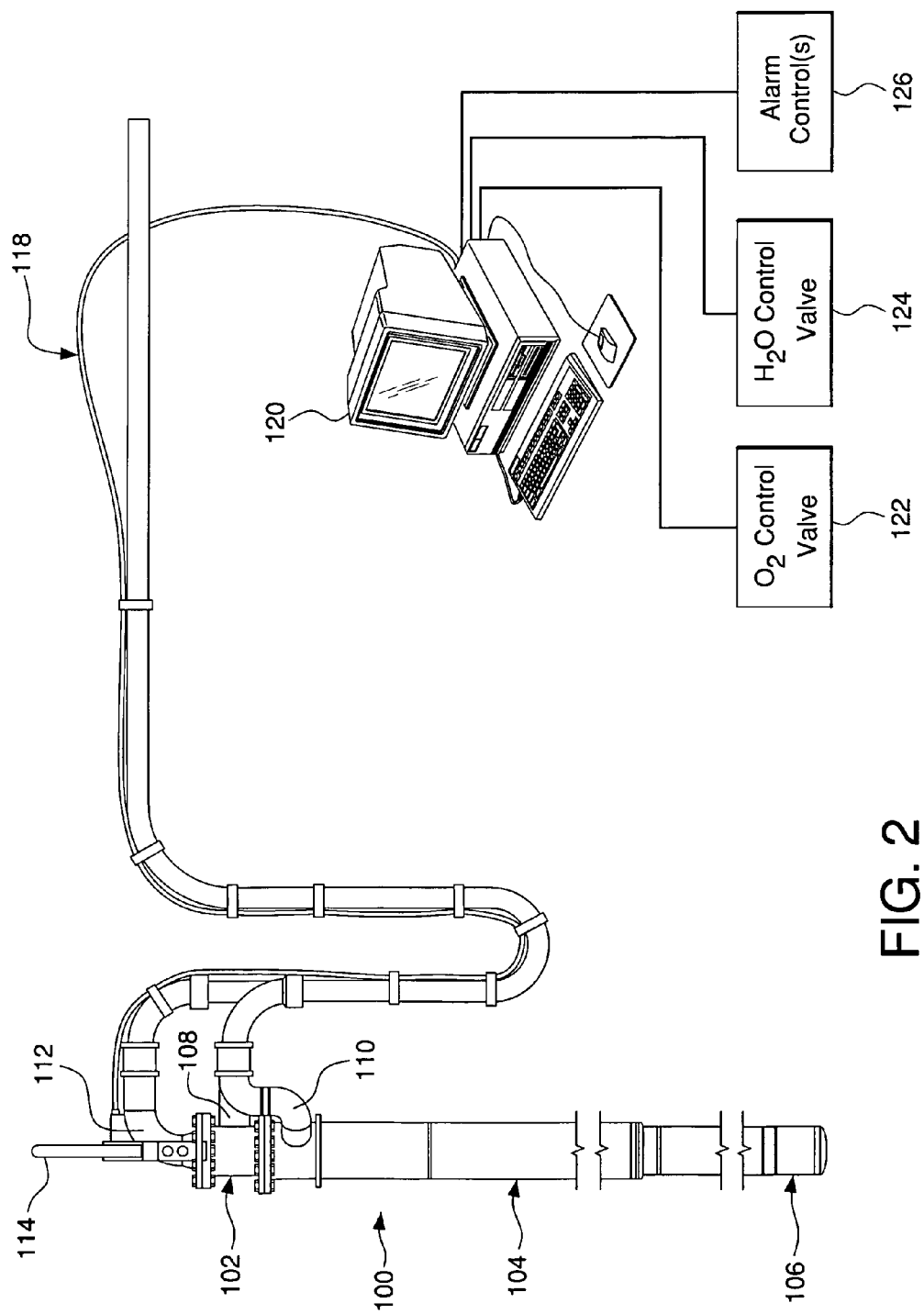
FIG. 2 is a schematic view of a metal making lance slag detection system according to the present invention.

FIG. 2 is a schematic view of a metal making lance slag detection system according to the present invention. The system includes a metal making lance 100 including an adapter portion 102, an elongated barrel portion 104 connected at a first end thereof to the adapter portion and lance tip portion 106 connected to a second end of the barrel portion. As is known, adapter portion 102 includes a coolant fluid inlet 108, a coolant fluid outlet 110 and at least one active material inlet 112. The adaptor portion also carries a bail member 114 which is engageable by the hook 116 (FIG. 3) of a suitable lance raising and lowering device.

The system according to the invention also includes slag sensor signal communication means 118 in the form of thermal or electronic communication wires, cables or the like which convey signals generated by the slag sensor (described below) to a control station 120. The control station may be a personal computer, a computer workstation, a limited function control box, or the like that is preferably located at an operator's pulpit (not illustrated) a safe distance from the furnace vessel. Control system 120 desirably comprises means operatively connected to an oxygen-containing gas control valve 122 for shutting off oxygen-containing gas flow when slag is detected by the slag sensor. The control station also optionally, and preferably, includes means operatively connected to a coolant fluid control valve 124 for shutting off coolant fluid flow and means operatively connected to alarm control(s) 126 for activating one or more audible and/or visible alarms when slag is detected by the slag sensor. It is also contemplated that control station 120 may be used to control any other lance operation mechanisms as may be desired or necessary in response to detection of slag in the lance.

Figure 3:
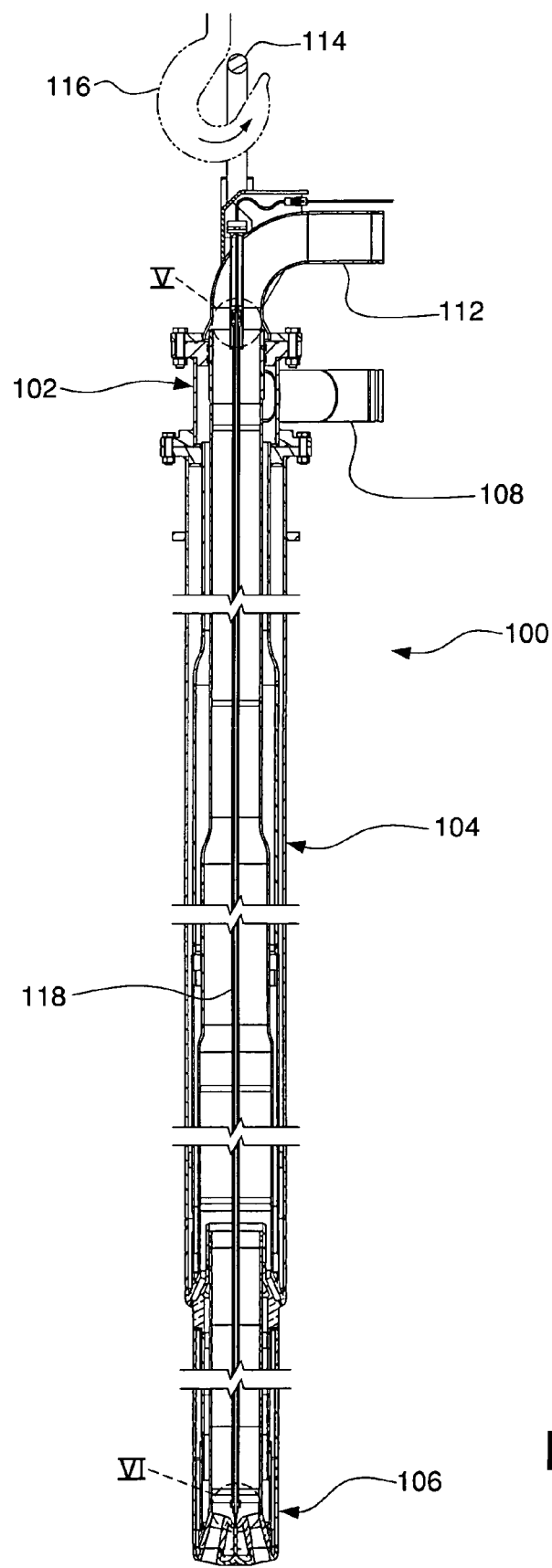
FIG. 3 is an elevational cross-section view of a metal making lance including internal slag detection means according to the present invention.
Figure 5:
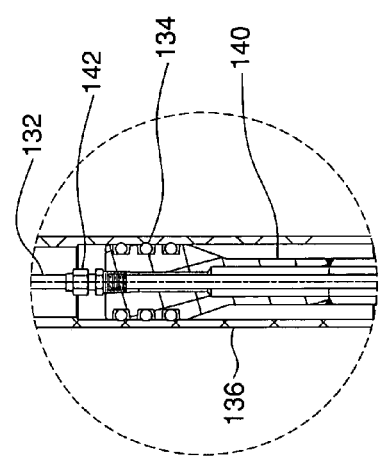
FIG. 5 is an enlarged view of encircled area V of FIG. 4 showing another portion of slag sensor signal communication means according to the present invention.
Figure 6:
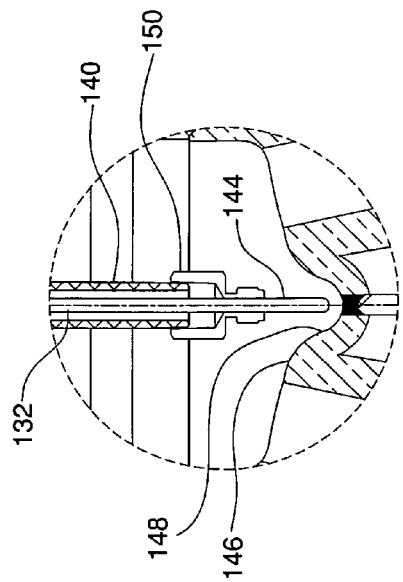
FIG. 6 is an enlarged view of encircled area VI of FIG. 4 showing a slag sensor and a lance tip inner wall of a lance tip assembly according to the present invention.
Figure 4:
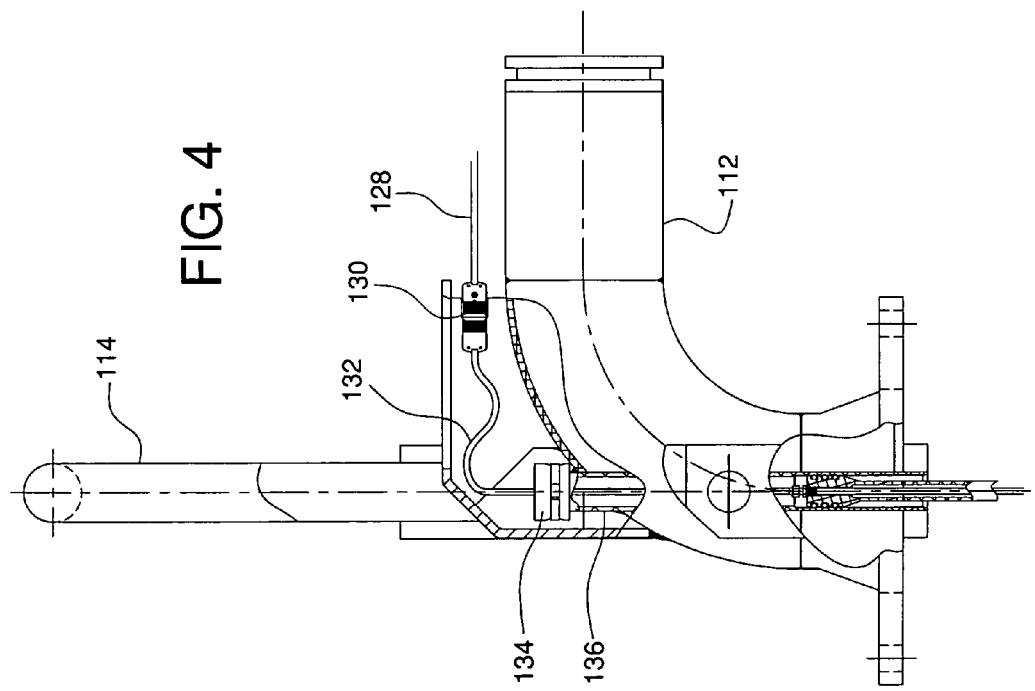
FIG. 4 is an enlarged view, in partial section, of a portion of slag sensor signal communication means according to the present invention.

FIG. 3 reveals the presently preferred manner by which the slag sensor signal communication means 118 enters lance 100 and extends through the central oxygen containing gas flow piping to a slag sensor, the details of which communication means 118 and sensor are provided in FIGS. 4-6.

As seen in FIG. 4, the slag sensor signal communication means 118 includes a first thermal or electrical communications wire 128 connected to control station 120. The first wire 128 is joined by a suitable connector 130 to one end of a second thermal or electrical communications wire 132. The second wire passes through a rubber cap or other sealing means 134 located at one end of a pipe 136 that is affixed to and projects into oxygen inlet 112. Second wire 132 extends substantially the entire length of the lance. As described in greater detail in connection with FIG. 6, if second wire 132 is a thermal communications wire or thermocouple, its distal end or exposed tip functions as a slag sensor. If second wire 132 is an electrical communications wire, its distal end is connected to a suitable electrical temperature sensor such as a resistance temperature detector (RTD).

Referring to FIG. 5, it will be seen that near the juncture of the oxygen inlet 112 with the lance, second wire 132 extends through a compression fitting 138 that is treadedly connected to the upper end of a wire shroud pipe 140 which is sealingly received within pipe 136 by one or more O-rings 142 or similar sealing means. Wire shroud pipe 140 surrounds essentially the remainder of the second wire.

Figure 7:
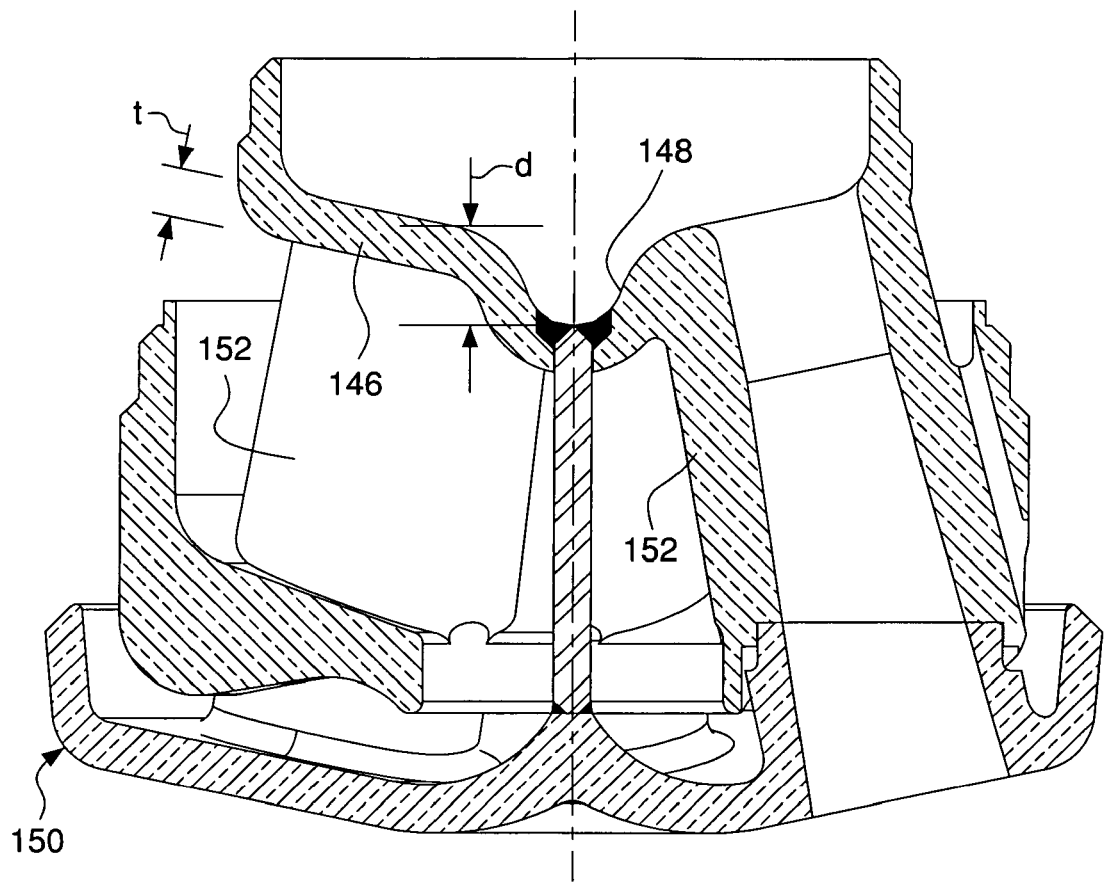
FIG. 7 is a further enlarged view of a lance tip assembly according to the present invention.

FIG. 6 illustrates an example of a slag sensor according to the present invention. In this embodiment the slag sensor is the exposed tip 144 of a thermocouple-type second wire 132. FIG. 6 also reveals another important feature of the present invention. In particular, the inner wall 146 of the lance tip preferably includes a slag reservoir 148 formed as a concave depression in the inner wall. According to a presently preferred embodiment shown in FIG. 7, slag reservoir 148 of lance tip assembly 142 has a depth "d" greater than the thickness "t" of inner wall 146. The steeply sloped walls of slag reservoir 148 serve to direct slag that is ingested through one or more nozzles 152 into the reservoir whereby it collects and may be quickly detected by the slag sensor. Toward that end, a compression-type or similar fitting 150 (FIG. 6) is provided to prevent relative movement of the slag sensor with respect to slag reservoir 148. The slag sensor, whether an RTD or the tip 144 of a thermocouple, is preferably placed adjacent or, even more preferably, within the slag reservoir 148 so that the sensor reacts rapidly to the presence of slag within the reservoir. Indeed, the operating temperature range of the slag sensor should be selected such that the sensor can tolerate direct contact with slag.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A metal making lance comprising:
    a lance body and a lance tip assembly connected to said lance body, said lance tip assembly comprising:
        an inner wall;
        a working face;
        at least one nozzle extending between said inner wall and said working face for discharging active material into a metal making furnace vessel;
        a furnace material reservoir in said inner wall for collecting furnace material ingested by said at least one nozzle; and
        a furnace material sensor disposed within said furnace material reservoir for detecting furnace material on an inner surface of said inner wall.

2. The metal making lance of claim 1 wherein said furnace material reservoir is formed as a concave depression in said inner wall.

3. The metal making lance of claim 1 wherein said furnace material reservoir has a depth greater than the thickness of said inner wall.

4. A system for detecting furnace material ingested by a metal making lance comprising:
    a lance body and a lance tip assembly connected to said lance body, said lance tip assembly comprising:
        an inner wall;
        a working face;
        at least one nozzle extending between said inner wall and said working face for discharging active material into a metal making furnace vessel, said inner wall including a furnace material reservoir for collecting furnace material ingested by said at least one nozzle;
    a furnace material sensor disposed within said furnace material reservoir for detecting furnace material on an inner surface of said inner wall;
    a control station for receiving signals from said furnace material sensor; and
    furnace material sensor signal communication means for conveying signals generated by said furnace material sensor to said control station.

5. The system of claim 4 wherein said furnace material reservoir is formed as a concave depression in said inner wall.

6. The system of claim 4 wherein said furnace material reservoir has a depth greater than the thickness of said inner wall.

7. The system of claim 4 wherein said control station includes means for controlling at least one operational system of said furnace in response to detection of furnace material by said furnace material sensor.

8. The system of claim 7 wherein said means for controlling comprise means operatively connected to an oxygen-containing gas control valve for shutting off oxygen-containing gas flow.

9. The system of claim 7 wherein said means for controlling comprise means operatively connected to a coolant fluid control valve for shutting off coolant fluid flow.

10. The system of claim 7 wherein said means for controlling comprise means operatively connected to at least one control for activating at least one of an audible and a visible alarm.

11. The system of claim 7 wherein said means for controlling comprise means operatively connected to a furnace drive for preventing tilting of a furnace vessel.

* * * * *